Patented Mar. 29, 1927.

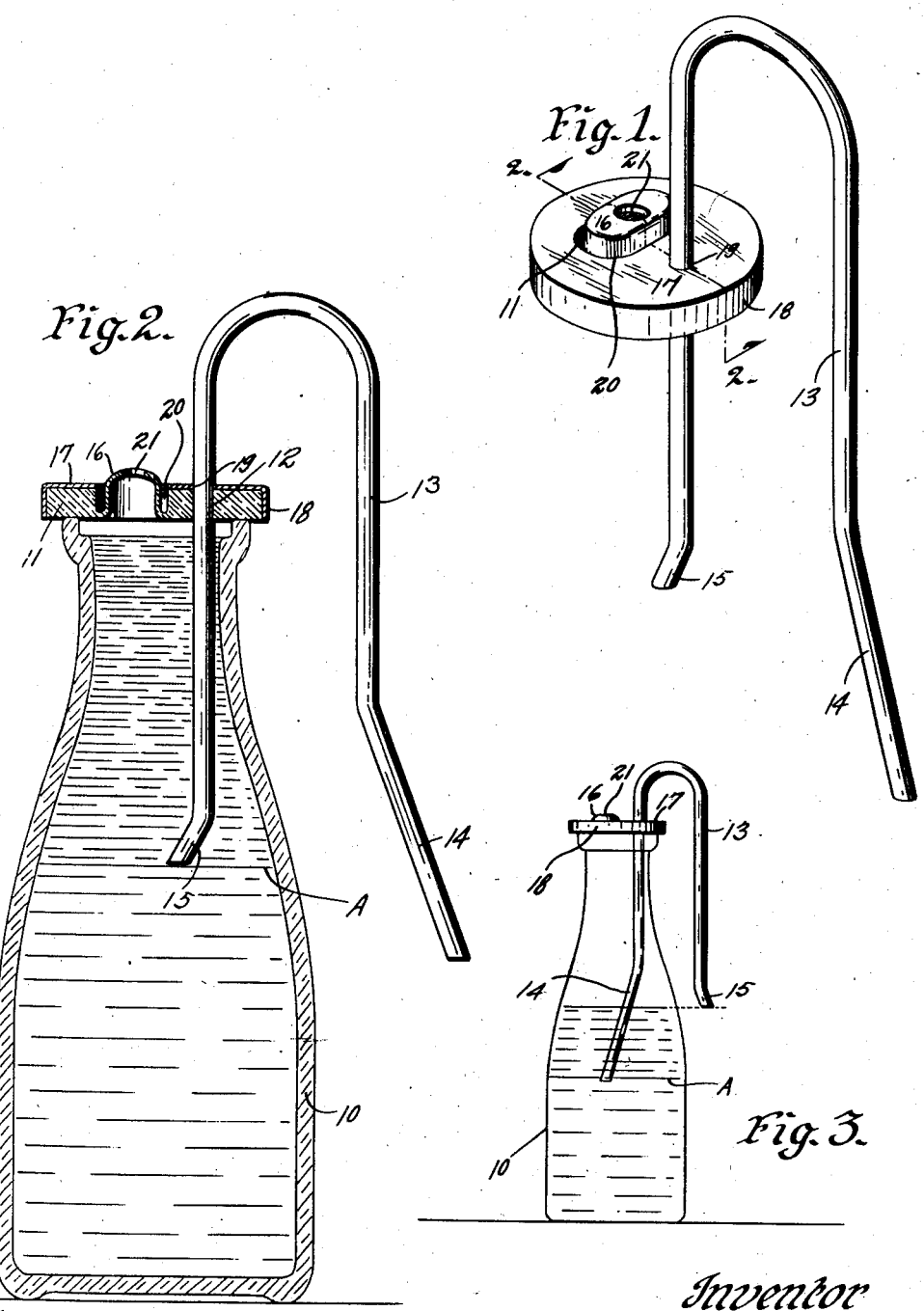

1,622,832

UNITED STATES PATENT OFFICE.

EDWARD G. LAMBERT, OF OTTUMWA, IOWA, ASSIGNOR OF ONE-HALF TO LEON LAMBERT, OF WICHITA, KANSAS.

CREAM REMOVER.

Application filed April 24, 1925. Serial No. 25,601.

My invention relates to that class of devices which may be employed for removing the cream from the top of a bottle or similar container.

It is the object of my invention to provide a cream remover of the general type mentioned of very simple construction, which can be manufactured from few parts at a relatively small expense.

A further object is to provide such a cream remover which can be readily and easily cleaned, which occupies a small space, which can be employed for removing the cream from the bottle by a very simple operation, which can be readily adjusted for removing milk from the bottle from below the cream, and which can be easily taken apart for storage in a minimum of space.

With these and other objects in view, my invention consists in the construction, arrangement and combination of the various parts of my cream remover, whereby the objects contemplated are attained, as hereinafter more fully set forth, pointed out in my claims, and illustrated in the accompanying drawings, in which:

Figure 1 shows a perspective view of a cream remover embodying my invention.

Figure 2 shows a vertical, central sectional view of a milk bottle with my cream remover thereon illustrated in section taken on the line 2—2 of Figure 1; and Figure 3 shows a side elevation of a milk bottle with my remover installed thereon with its parts adjusted for taking milk from below the cream in the bottle.

It is well known that it is sometimes desirable to remove cream from the top of the bottles in which milk is almost universally sold at retail in cities.

I have provided a very simple and inexpensive structure whereby the cream can be removed.

In the accompanying drawings, I have shown an ordinary milk bottle, which I have indicated by the reference numeral 10. My improved cream remover comprises a cover or closure element for the top of the bottle adapted to seal with relation to the bottle. This closure member may be of any desired form, shape or material to accomplish the purpose.

In the particular form of my invention shown here, I have employed a soft rubber disc 11 adapted to seat on the top of the bottle and by virtue of its resiliency to seal with the bottle edge.

The disc 11 has a hole 12 extended through it to receive the siphon tube hereinafter referred to.

Extended through the hole 12 of the member 11 is one arm of a siphon tube 13, the lower ends of which are preferably inclined outwardly slightly as at 14 and 15. It will, of course, be understood that one end or arm of the siphon tube is longer than the other.

It is necessary that the closure member as a whole or part be capable of being forced downwardly for compressing the air in the top of the bottle for forcing cream into the siphon tube for starting the siphoning action.

In the particular form of my invention here disclosed, I have shown the rubber disc 11, which is of substantial thickness provided with a soft, thin, upwardly convexed section or portion 16 connected at its lower part integrally or otherwise with the lower part of the disc, so that the main body portion of the thin cup-shaped part 16 is contained within the outlines of the disc.

This particular structure I consider an invention although its general purpose might be embodied in the complete structure without the use of the particular arrangement of the part 16 here shown. The arrangement here shown affords protection for the thin cup-shaped member 16 and also gives a sufficiently stiff support therefor, comprising the main body of the disc 11.

I preferably enclose the disc 11 in a casing comprising a top disc-shaped member 17 with an annular flange 18. The casing has a hole 19 registering with the hole 12 to admit the siphon tube, and has an opening 20 around the cup-shaped portion 16, as shown in Figures 1 and 2.

In the particular form of the device here shown, the cup-shaped member 16 projects upwardly slightly above the disc 11 and the disc member 17 of the casing. The casing may be of aluminum or other suitable material. The portion 16, I provide with a vent 21.

Either arm of the siphon tube 13 may be mounted in the closure member and this feature of the invention will be again referred to.

In the practical use of my improved cream remover and assuming that it is desired to remove the cream from the top of the bottle, the operation of the device is as follows:

In the drawings, I have shown in the bottle 10, the body of milk 22 above which is the body of cream 23. The milk stands about at the height A.

To remove the cream, the closure member 11 is placed on top of the bottle with the short arm of the siphon inserted through the closure member. The short arm of the siphon tube is adjusted longitudinally and slidably in the closure member until the lower end thereof is just at the lower part of the body of cream.

The user then presses the member 11 snugly against the top of the bottle, puts his thumb on the portion 16 closing the vent 21, and gives a quick downward pressure collapsing the member 16. This compresses air in the top of the bottle and forces cream into the siphon tube, whereupon the cream will flow out of the bottle through the siphon tube and can be caught in a glass or the like.

When the cream is entirely removed and the liquid level in the bottle reaches the lower end of the shorter siphon tube arm, the flow ceases.

If it is desired to remove some of the milk from the bottle without taking the cream from the bottle, this can be done by inserting the long arm of the siphon into the closure member 11 and into the bottle as illustrated in Figure 3.

By adjusting the device until the short arm of the siphon outside the bottle is on the level with the lower level of the body of the cream, then by actuating the device in the way above mentioned, milk can be taken from the bottle, and when the level of liquid therein reaches the level of the lower end of the short arm of the siphon, as shown in Fig. 3, the flow will cease.

It will be seen from the foregoing that I have provided a cream remover of very simple and inexpensive construction, which can be made and sold at a reasonable cost. The parts may be easily cleaned. The closure member never comes into contact with the cream or the milk.

The siphon tube, I preferably make of aluminum which is easily scalded and cleaned. It can be slid into and out of the rubber disc 11 many times without destroying the tightness of the joint between the parts.

The means for starting the flow into the siphon is very simple and in the form here shown has several advantages. The vent 21 through which air passes into the bottle during the outflow of milk is easily closed by the finger when the member 16 is pressed downwardly. The member 16 is substantially protected within the outline of the disc 11 and yet is readily accessible for starting the flow.

Some changes may be made in the construction and arrangement of the various parts of my improved cream remover without departing from the real spirit and purpose of my invention, and it is my intention to cover by my claims, any modified forms of structure or use of mechanical equivalents, which may be reasonably included within their scope.

I claim as my invention:

1. In a cream remover of the kind described, a closure device adapted to seal with a container top adapted to be actuated for compressing the air in the container, a siphon tube having one arm adjustably mounted in said closure member by a tight joint therewith, said closure member having a relatively stiff peripheral portion adapted to rest on a bottle top and a relatively yieldable portion, comprising an upwardly convexed cup-shaped member connected at its lower part with the lower part of the closure member.

2. In a cream remover of the kind described, a closure device adapted to seal with a container top adapted to be actuated for compressing the air in the container, a siphon tube having one arm adjustably mounted in said closure member by a tight joint therewith, said closure member having a relatively stiff portion and a relatively yieldable portion, comprising an upwardly convexed cup-shaped member connected at its lower part with the lower part of the closure member, and a metal cap for said closure member having openings for the siphon tube and the cup-shaped portion of the closure member.

Des Moines, Iowa, April 7, 1925.

EDWARD G. LAMBERT.